US006886883B2

United States Patent
Jacquemard et al.

(10) Patent No.: US 6,886,883 B2
(45) Date of Patent: May 3, 2005

(54) VEHICLE BUMPER INCLUDING A SPOILER HINGED BETWEEN THREE POSITIONS OF STABLE EQUILIBRIUM

(75) Inventors: Claude Jacquemard, Jujurieux (FR); Arnold Fayt, Jujurieux (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/671,564

(22) Filed: Sep. 29, 2003

(65) Prior Publication Data
US 2004/0113457 A1 Jun. 17, 2004

(30) Foreign Application Priority Data
Oct. 2, 2002 (FR) .............................................. 02 12197

(51) Int. Cl.[7] .............................................. B62D 37/02
(52) U.S. Cl. ..................... 296/180.5; 293/118; 180/903
(58) Field of Search ........................... 296/180.1, 180.5; 293/118, 119; 180/903

(56) References Cited

U.S. PATENT DOCUMENTS

| 3,618,998 | A | * | 11/1971 | Swauger | 296/180.5 |
| 4,119,339 | A | * | 10/1978 | Heimburger | 296/180.5 |
| 4,131,308 | A | * | 12/1978 | Holka et al. | 296/180.5 |
| 4,159,140 | A | * | 6/1979 | Chabot et al. | 296/180.5 |
| 4,457,558 | A | * | 7/1984 | Ishikawa | 296/180.5 |
| 4,659,130 | A | * | 4/1987 | Dimora et al. | 296/180.1 |
| 4,904,016 | A | | 2/1990 | Tatsumi et al. | |
| 4,951,994 | A | * | 8/1990 | Miwa | 296/180.1 |
| 4,976,489 | A | * | 12/1990 | Lovelace | 296/180.1 |
| 6,196,620 | B1 | * | 3/2001 | Haraway, Jr. | 296/180.5 |

FOREIGN PATENT DOCUMENTS

EP 1 052 151 A2 11/2000

* cited by examiner

Primary Examiner—Lori L. Coletta
(74) Attorney, Agent, or Firm—Oliff & Berridge, PLC

(57) ABSTRACT

The invention relates to a motor vehicle bumper which comprises a shield and a spoiler hinged between two positions of stable equilibrium, namely a high position in which at least a part of the spoiler projects from the shield, and a low position in which the spoiler extends the bumper in a downward direction. The spoiler is suitable for adopting a third position of stable equilibrium, in which it is completely retracted behind the shield.

8 Claims, 3 Drawing Sheets

VEHICLE BUMPER INCLUDING A SPOILER HINGED BETWEEN THREE POSITIONS OF STABLE EQUILIBRIUM

The present invention relates to vehicle aerodynamics.

It relates to a vehicle bumper which, for the purpose of modifying the aerodynamics of the vehicle as a function of its speed, includes a spoiler hinged between a high position, which it occupies at low speed, in order to facilitate traveling in built-up areas where it is necessary to be able to deal with the obstacles that are to be encountered therein (sidewalks, humps, sloping access ramps, etc.), and a low position, which it occupies at high speed, in order to reduce the value of the vehicle's drag coefficient (usually written Cx), thereby providing substantial savings in fuel consumption while also increasing the ground effect to improve the vehicle's road holding.

BACKGROUND OF THE INVENTION

Such a bumper is known in particular from the French patent application in the name of the Applicant published under the No. FR-2 795 039.

That bumper, which is already fitted to a certain number of vehicles on the market, has already given and will continue to give satisfaction to the owners of vehicles so equipped, in particular because of the variety of uses it makes possible.

Nevertheless, vehicle owner requirements continue to become more difficult to please. Manufacturers naturally seek to satisfy them.

Thus, vehicles have recently appeared on the market that are described as being ultra-versatile, where the owner seeks not only to make use of the vehicle on roads or highways, which requires stability and road holding, but also seeks to use the vehicle off the road, which requires sufficient ground clearance to give the vehicle good ability to pass obstacles.

Under such conditions, it must be accepted that it is necessary to further increase the versatility of bumpers for fitting to such vehicles, in particular.

OBJECTS AND SUMMARY OF THE INVENTION

It is in this context that the research and development that led to the invention was undertaken, which invention provides a motor vehicle bumper which comprises a shield and a spoiler hinged between two positions of stable equilibrium, namely a high position in which it projects at least in part downwards from the shield, and a low position in which it extends the shield downwards, the spoiler being suitable for adopting a third position of stable equilibrium referred to as a "retracted" position, in which it is fully retracted behind the shield.

The retracted position of the spoiler enables the ground clearance of the vehicle to be increased, thereby giving it greater ability to pass obstacles, in particular for off-road use.

Preferably, the spoiler is mounted both to pivot about a transverse axis, and to slide in a longitudinal direction between a front position in which it is close to the shield and a rear position in which it is spaced apart therefrom.

In a particular embodiment, the bumper includes a clutch mechanism suitable, under certain "retraction" conditions, for enabling the spoiler to pass from its high position towards its retracted position, and under certain "deployment" conditions, for enabling the spoiler to pass from its retracted position towards its high position.

This clutch mechanism, which is capable of allowing the spoiler to pass from its front position towards its rear position, and vice versa, can be actuated either manually, at will, or else automatically as a function of the conditions to which the vehicle is subjected. This provides great flexibility in use.

For example, the clutch mechanism comprises a rod having an inside end slidably engaged with the spoiler, the rod being slidably mounted between a deployed position in which it entrains the spoiler towards its front position, and a retracted position in which it enables the spoiler to occupy its rear position.

In another particular embodiment, the clutch mechanism includes a return spring which continuously stresses the rod towards its deployed position.

The bumper may further include an abutment which limits the upward stroke of the spoiler, said abutment being suitable for preventing the spoiler from passing from its high position towards its retracted position.

For example, the bumper defines a housing behind the shield, and the spoiler presents a forward lip which, in the retracted position, is placed in said housing to hold the spoiler in the retracted position.

A return device may be provided to stress the spoiler continuously upwards.

By way of example, the return device comprises a traction spring anchored to the spoiler, the spring being tared to enable the spoiler to pass from its high position towards its low position, and vice versa, as a function of the speed of the vehicle.

An abutment may also be provided limiting the downward stroke of the spoiler.

BRIEF DESCRIPTION OF THE DRAWINGS

Other objects and advantages of the invention appear in the light of the following description of an embodiment, given by way of non-limiting example and made with reference to the accompanying drawings, in which.

MORE DETAILED DESCRIPTION

Figure 1:
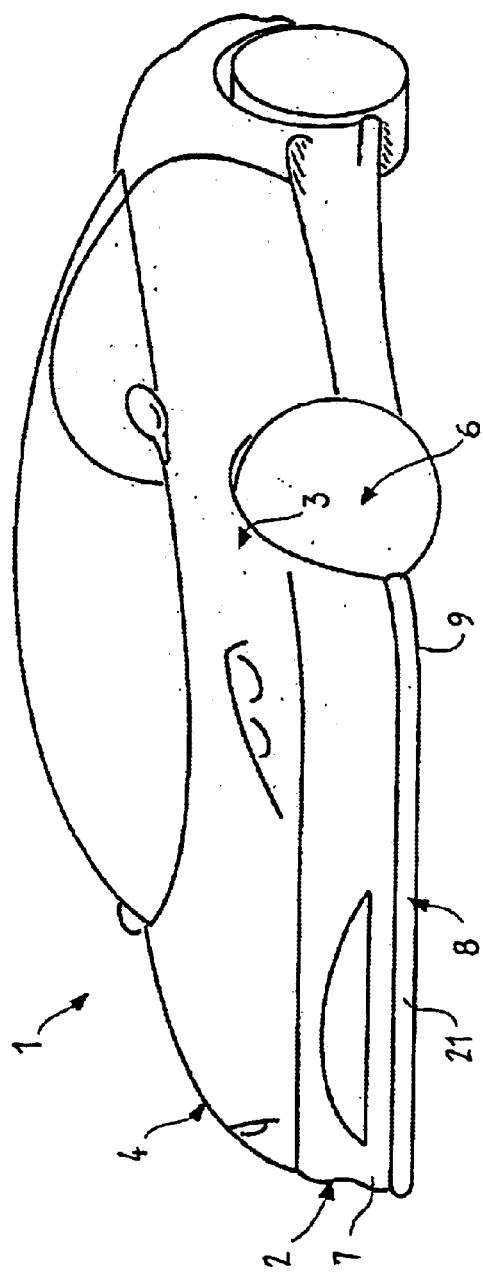
FIG. 1 is a perspective view of a motor vehicle fitted with a bumper provided with a hinged spoiler.

FIG. 1 shows a motor vehicle 1 fitted with a front bumper 2 which extends between the left front fender 3 and the right front fender 4 of the vehicle 1. Naturally, the shape proposed for the vehicle 1 is purely illustrative and cannot be considered limiting possible uses of the invention.

The bumper 2 comprises a spoiler support 5 situated in front of the front axle 6 of the vehicle 1, and fixed rigidly to or integral with the main structure of the vehicle. A shield 7 is mounted on the support 5. This shield 7, also referred to as a "bumper skin" performs an essentially decorative function, however in conventional manner it also serves to absorb impacts of small size.

The bumper 2 also comprises a spoiler 8 which is hinged to the support 5. The spoiler 8 serves firstly to improve the aerodynamics of the vehicle 1 at high speed by reducing its drag coefficient (Cx) and secondly, likewise at high speed, to improve the road holding of the vehicle 1 by creating a ground effect which tends to hold the vehicle 1 down against the road.

The effectiveness of the spoiler 8 at high speed improves as the position of the spoiler 8 comes closer to the ground. Nevertheless, when the vehicle 1 is lowered excessively in this way it encounters difficulties in overcoming certain road obstacles of the kind that are to be found in built-up areas in particular: sidewalks, humps, etc.

That is why the spoiler 8 is mounted so as to be hinged between two distinct positions of stable equilibrium that it occupies as a function of the speed of the vehicle 1, namely:

a high position in which at least part of the spoiler 8 projects downwards from the shield 7, this position being occupied at low speed in order to enable the vehicle 1 to overcome certain obstacles; and a low position, situated below the high position, in which the spoiler 8 extends the bumper 2 in a downward direction and, in practice, occupies a position close to the ground, which position is occupied at high speed in order to reduce the drag coefficient of the vehicle 1, and thus create a ground effect.

Figure 2:
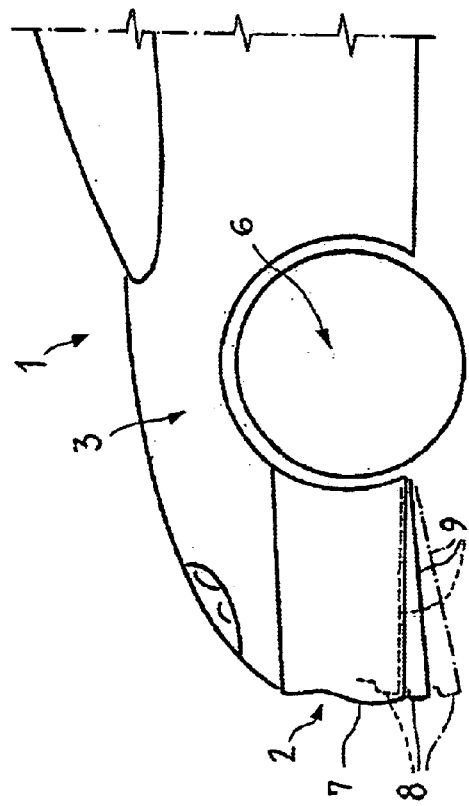
FIG. 2 is a fragmentary side view showing the front left fender and the bumper of the vehicle, with the spoiler being shown in its three positions of stable equilibrium, namely a high position drawn in continuous lines, a low position drawn in chain-dotted lines, and a retracted position drawn in dashed lines.
Figure 3:
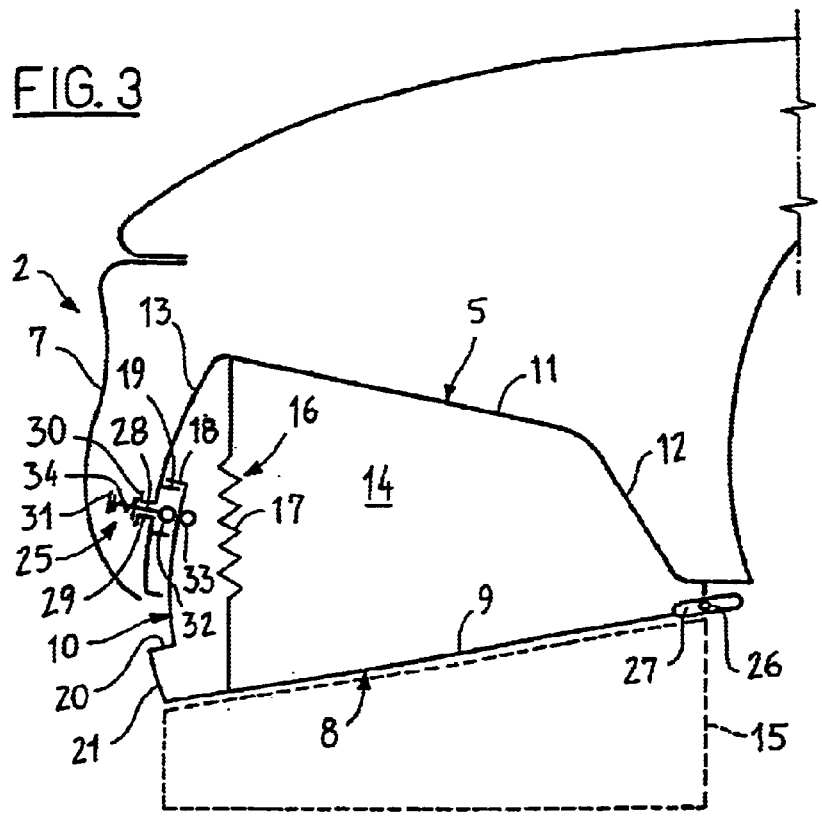
FIG. 3 is a diagrammatic side view showing the internal support of the FIG. 2 bumper, with the spoiler in its low position.
Figure 4:
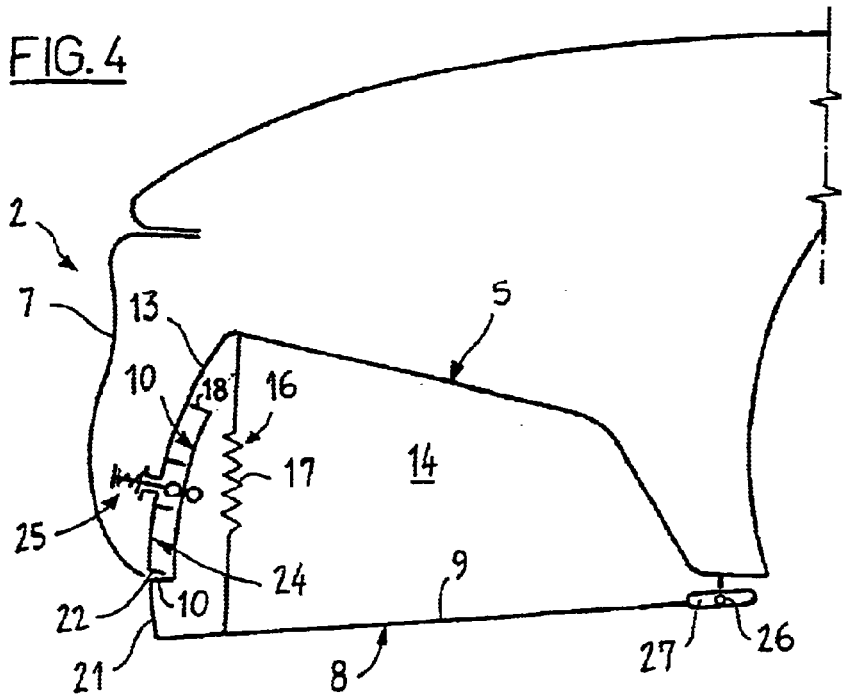
FIG. 4 is a view analogous to FIG. 3, in which the spoiler is shown in its high position.

The spoiler 8 shown in its high position both in FIG. 4 and as continuous lines in FIG. 2. It is shown in its low position both in FIG. 3 and in chain-dotted lines in FIG. 2.

As can be seen in FIGS. 3 to 6, the spoiler has a substantially flat bottom wall 9 which extends beneath the vehicle 1 and forms a deflector that serves to decrease the drag coefficient by modifying the flow of air under the vehicle 1.

When the spoiler 8 is in its low position, the bottom wall 9 slopes relative to the ground. It is therefore closer to the ground at the front than at the rear, thereby acting at high speed to create suction beneath the vehicle 1 that tends to press the vehicle down against the road: this is the ground effect.

At the front, the bottom wall 9 is extended by a front wall 10 which extends substantially perpendicularly to the bottom wall 9, behind the shield 7.

As explained below, the spoiler 8 passes between these two positions as a function of the speed of the vehicle 1.

As can be seen in FIGS. 3 to 6, the spoiler support 5 comprises a top partition 11 extended rearwards by a rear partition 12 and forwards by a front partition 13, these three partitions 11, 12, and 13 defining a cavity 14 which is closed by the spoiler 8 when it is assembled to the support 5.

Its front wall 10 is then behind the front partition 13 of the support 5, facing it, while the bottom surface of its bottom wall 9 facing away from the cavity 14 defines a volume of air 15 under the vehicle 1.

The air pressure that exists above the spoiler 8, i.e. in the cavity 14, is substantially constant and equal to atmospheric pressure, regardless of the speed of the vehicle 1.

In contrast, the air pressure that exists in the volume 15 beneath the spoiler 8 depends on the speed of the vehicle 1. This pressure is substantially equal to atmospheric pressure when the vehicle 1 is traveling at low speed, however it drops below atmospheric pressure when the vehicle 1 is traveling at high speed.

Thus, when the vehicle 1 is traveling at high speed, the pressure difference between the cavity 14 and the volume 15 tends to cause the spoiler 8 to tilt downwards.

However, when the speed of the vehicle 1 decreases the pressure difference decreases, and the spoiler 8 which is subjected to a return device 16 that stresses it continuously upwards, itself tends to move towards its high position.

In an embodiment shown in FIGS. 3 to 6, the return device 16 comprises a traction spring 17 tensioned between the support 5 and the spoiler 8.

The stiffness of this traction spring 17 is selected so as to enable the spoiler 8 to begin to leave its high position and move towards its low position as a function of some predetermined minimum threshold speed (e.g. about 60 kilometers per hour (km/h)), and conversely, enables the spoiler 8 to begin to leave its low position and move towards its high position as a function of some predetermined maximum threshold speed (e.g. about 90 km/h).

When the vehicle 1 is traveling at speeds lying between the minimum and maximum threshold speeds, the spoiler 8 oscillates between its high position and its low position.

In order to keep the spoiler 8 in its low position when the speed of the vehicle 1 exceeds the maximum threshold speed, e.g. on a highway, and conversely in order to keep the spoiler 8 in its high position when the vehicle 1 drops below the minimum threshold speed, e.g. in a built-up area, two abutments are provided to limit the stroke of the spoiler 8, respectively downwards and upwards.

Thus, the front wall 10 of the spoiler 8 has a free top end 18 curved towards the front partition 13 of the support 5, which partition has a projecting rib 19 against which the curved top end 18 comes to bear when the spoiler 8 is in its low position (FIG. 3). The rib 19 thus forms a first abutment which limits the downward stroke of the spoiler 8.

Furthermore, the front wall 10 of the spoiler 8 also presents a shoulder 20 at a certain distance above the bottom wall 9, thus defining a lip 21 at the front of the spoiler 8 which, when the spoiler 8 is in its high position, serves to extend the shield 7 downwards (FIG. 4).

The front partition 13 of the support 5 presents a bottom rim 22 that is folded rearwards, and against which the shoulder 20 comes to bear when the spoiler 8 is in its high position. This rim 22 thus forms a second abutment that serves to limit the upward stroke of the spoiler 8.

In addition to the high and low positions defined above, the spoiler 8 is also suitable, under certain conditions defined below, for adopting a third position of stable equilibrium referred to as a "retracted" position which is situated above the high position, with the spoiler then being fully retracted behind the shield 7 and in which the bottom wall 9 is substantially parallel to the ground.

In this retracted position of the spoiler 8, the ground clearance of the vehicle 1 is at its maximum, thereby enabling it to go past obstacles that it would not be able to pass with the spoiler 8 in its high position.

This makes the vehicle 1 more versatile, in particular for extreme conditions of use such as use off the road.

Figure 6:
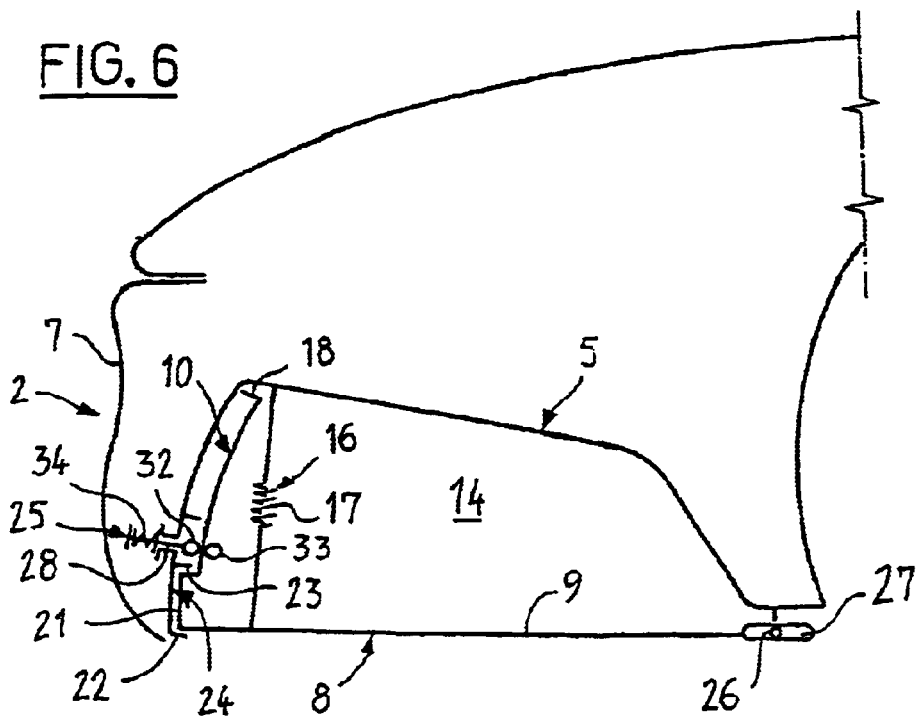
FIG. 6 is a view analogous to FIGS. 3 to 5, in which the spoiler is shown in its retracted position.

The support 5 has a rib 23 projecting from the front partition 13 towards the cavity 14 and co-operating with the rim 22 and the front partition 13 behind the shield 7 to define a housing 24 into which the lip 21 is placed when the spoiler 8 is in its retracted position, as shown in FIG. 6.

This housing 24 of shape that is substantially complementary to that of the lip 21 enables the spoiler 8 to be held vertically in both directions by means of the rib 23 and the rim 22.

So long as certain "retraction" conditions are not satisfied, the spoiler 8 remains in its high position without being capable of moving into its retracted position.

Similarly, once in its retracted position, it is held therein by the lip 21 being positioned in the housing 24 until certain "deployment" conditions are satisfied.

The bumper 2 includes a clutch mechanism 25 suitable, when retraction conditions are satisfied, for allowing the spoiler 8 to pass from its high position to its retracted position, and conversely, when deployment conditions are satisfied, for allowing the spoiler 8 to pass from its retracted position to its high position.

Retraction and deployment conditions are defined below.

As can be seen in FIGS. 3 to 6, the spoiler 8 is pivotally mounted relative to the support 5 about a transverse axis extending parallel to the axles of the vehicle 1.

More particularly, the support 5 carries two pins 26 disposed beside the left and right fenders 3 and 4, respectively. Each pin 26 is received in a window 27 formed in the spoiler 8 at its rear end, so that together each pin 26 and the associated window 27 form a hinge for the spoiler 8.

However, the spoiler 8 is also mounted to slide relative to the support 5 in a longitudinal direction between:

a front position in which its front wall 10 is pressed against the front partition 13 of the support 5, which is the position it occupies when it is retracted, and also while it is in its high and low positions and in any position intermediate between said high and low positions; and a rear position in which its front wall 10 is spaced apart sufficiently from the front partition 13 of the support 5 to enable the spoiler 8 to pass freely from its retracted position to its high position, and vice versa.

As can be seen in FIGS. 3 to 6, the window 27 is thus in the form of a longitudinally extending oblong slot, with the pin 26 being capable of sliding backwards and forwards therein.

The clutch mechanism 25, which is suitable for causing the spoiler 8 to go from its front position towards its rear position, and vice versa, has a rod 28 mounted on the front partition 13 of the support 5, through which it passes in a longitudinal direction.

More precisely, the rod 28 is engaged in a guide cylinder 29 which projects from the front partition 13 of the support 5 away from the cavity 14 and terminates in a free end 30 in the form of a collar.

The rod 28 presents a T-shaped profile, and at its outside end, situated outside the cavity 14 it has a flat head 31, while at its opposite, inside end situated inside the cavity 14 it has two wheels 32 and 33 which take up positions on either side of the front wall 10 of the spoiler 8 so that the rod 28 is slidably engaged therewith. As a result, the rod 28 is constrained to move with the spoiler 8 in its longitudinal sliding movements, but leaves the spoiler 8 free to pivot about its axis.

Figure 5:
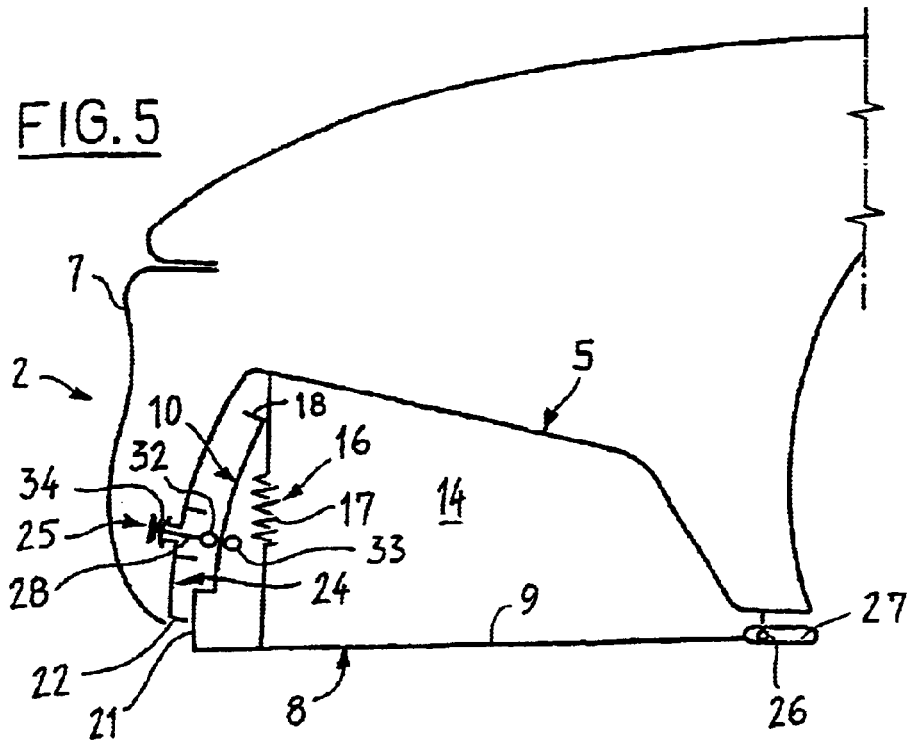
FIG. 5 is a view analogous to FIGS. 2 and 3, in which the spoiler is shown in an intermediate position between its high position and its retracted position.

The rod 28 is mounted to slide between a deployed position as shown in FIGS. 3, 4, and 6, where it tends to entrain the spoiler 8 towards its front position, and a retracted position shown in FIG. 5 where it enables the spoiler 8 to occupy its rear position, or in which it tends to entrain the spoiler towards said position.

The clutch mechanism 25 also has a return spring 34 operating in compression, which spring is engaged on the rod 28, is interposed between the head 31 thereof and the collar 30 of the guide cylinder 29, and thus continuously stresses the rod 28 towards its deployed position in which it entrains the spoiler 8 towards its front position.

When the spoiler 8 is in its high position, two distinct retraction conditions enable it to pass into the retracted position.

The first of these conditions is manual pressure exerted on the head 31 of the rod against the return spring 34 with sufficient force to compress the spring. Under this pressure, the rod 28 penetrates further into the cavity 14 towards its retracted position, moving the spoiler 8 towards its rear position.

The shoulder 20 is then offset rearwards from the rim 22 which can no longer act as an abutment, with the spoiler 8 simultaneously being stressed upwards by the traction spring 17.

The lip 21 thus moves past the front rim 22 and takes up a position facing the housing 24. It suffices to release the pressure exerted on the rod 28 for its return spring 24 to relax, thereby moving the spoiler 8 towards its front position by means of the wheels 32 and 33, so that the lip 21 becomes positioned in the housing 24.

The second of the retraction conditions is pressure being exerted directly on the lip 21 from the front towards the rear, and with sufficient force to act via the wheels 32 and 33 to compress the return spring 34 and retract the rod 28.

This pressure can be exerted manually. It can also be the result of the lip 21 of the spoiler 8 striking an obstacle that it happens to encounter, for example a high sidewalk curb.

In any event, the spoiler 8 is then pushed into its rear position which, as described above, allows it to tilt upwards, i.e. towards its retracted position under the action exerted by the traction spring 17.

As a result, the spoiler 8 retracts automatically in the event of front impact with an obstacle. Sheltered in this way, it is preserved from being damaged.

When the spoiler 8 is already in its retracted position, two distinct deployment conditions enable it to pass to its high position.

The first of these deployment conditions is manual pressure exerted on the head 31 of the rod against the return spring 34 with sufficient force to compress the return spring. Under this pressure, the rod 28 penetrates into the cavity 14 stressing the spoiler 8 towards its rear position.

It then suffices to apply sufficient downward manual traction to overcome the resistance of the traction spring 17 and cause the spoiler 8 to tilt downwards.

Once the lip 21 has gone past the rim 22, it suffices to release the pressure exerted on the rod 28 which, on returning to its deployed position, takes the spoiler 8 towards its front position.

The spoiler 8 then occupies its high position.

The second of the deployment conditions occurs when the vehicle is running, and when a sufficient difference of air pressure occurs between the cavity 14 and the volume of air 15 beneath the spoiler 8.

Under the effect of such suction, suitable for overcoming the resistance opposed by the traction spring 17, the spoiler 8 tends to pivot downwards.

The lip 21 then slides over the rim 22 which, for this purpose, slopes slightly in a downward direction, as can be seen in FIGS. 3 to 6, thereby constituting a cam path stressing the spoiler 8 rearwards out from its housing 24, which spoiler 8 acts via the wheels 32 and 33 to take the rod 28 with it towards the position in which the rod is retracted against its return spring 34 which becomes compressed.

Once the lip 21 has been offset far enough relative to the rim 22, i.e. once the rod 28 has reached its retracted position, the spoiler 8 is free to tilt downwards under the effect of the suction between the cavity 14 and the volume 15. It returns to its front position under the effect of the return spring 14 relaxing as soon as the lip 21 has gone past the rim 22, i.e. as soon as the shoulder 20 has gone past it.

The spoiler 8 then occupies its high position which it is free to leave by tilting downwards depending on the pressure difference between the cavity 14 and the volume of air 15 beneath the spoiler 8.

What is claimed is:

1. A motor vehicle bumper which comprises a shield and a spoiler hinged between two positions of stable equilibrium, namely a high position in which it projects at least in part downwards from the shield, and a low position in which it extends the bumper in a downward direction, wherein:

the bumper includes a return device continuously stressing the spoiler upward, the bumper includes an abutment which limits the upward stroke of the spoiler, said abutment being suitable for preventing the spoiler from passing from its high position toward a third position of stable equilibrium referred to as a "retracted" position, in which it is fully retracted behind the shield, and the spoiler is suitable for moving past the abutment to adopt its retracted position.

2. A bumper according to claim 1, in which the spoiler is mounted both to pivot about a transverse axis, and to slide in a longitudinal direction between a front position in which it is close to the shield and a rear position in which it is spaced apart therefrom.

3. A bumper according to claim 1, including a clutch mechanism suitable for enabling the spoiler to pass from its high position towards its retracted position, and to allow the spoiler to pass from its retracted position towards its high position.

4. A bumper according to claim 2, including a clutch mechanism suitable for enabling the spoiler to pass from its high position towards its retracted position, and to allow the spoiler to pass from its retracted position towards its high position, and wherein the clutch mechanism is also suitable for causing the spoiler to pass from its front position towards its rear position, and vice versa.

5. A bumper according to claim 4, wherein said clutch mechanism comprises a rod having an inside end slidably engaged with the spoiler, the rod being slidably mounted between a deployed position in which it entrains the spoiler towards its front position, and a retracted position in which it enables the spoiler to occupy its rear position.

6. A bumper according to claim 5, wherein the clutch mechanism includes a return spring which continuously stresses the rod towards its deployed position.

7. A bumper according to claim 1, defining a housing behind the shield, and wherein the spoiler presents a forward lip which, in the retracted position, is placed in said housing to hold the spoiler in the retracted position.

8. A bumper according to claim 1, wherein said return device comprises a traction spring anchored to the spoiler, the spring being tared to enable the spoiler to pass from its high position towards its low position, and vice versa, as a function of the speed of the vehicle.

* * * * *